United States Patent
Satoh et al.

(10) Patent No.: US 6,780,964 B2
(45) Date of Patent: Aug. 24, 2004

(54) METHOD FOR PREPARING POLYETHER POLYOL COPOLYMER

(75) Inventors: Hiroshi Satoh, Yokohama (JP); Hideyuki Ishii, Yokohama (JP)

(73) Assignee: Hodogaya Chemical Co., Ltd., Kanagawa (JP)

( * ) Notice: Subject to any disclaimer, the term of this patent is extended or adjusted under 35 U.S.C. 154(b) by 0 days.

(21) Appl. No.: 10/223,564

(22) Filed: Aug. 19, 2002

(65) Prior Publication Data

US 2003/0069390 A1 Apr. 10, 2003

(51) Int. Cl.$^7$ ................................. C08G 65/34
(52) U.S. Cl. .............. 528/425; 528/403; 528/486; 525/328.9
(58) Field of Search ................ 528/425, 403, 528/486; 525/328.9

(56) References Cited

U.S. PATENT DOCUMENTS

| 4,658,065 A | 4/1987 | Hisaya et al. |
| 6,313,262 B1 | 11/2001 | Chung et al. |

FOREIGN PATENT DOCUMENTS

| JP | 59-189120 A | 10/1984 |
| JP | 60-203633 A | 10/1985 |
| JP | 60-203633 | 11/1985 |
| JP | 61-120830 | 6/1986 |
| JP | 61-123626 | 6/1986 |
| JP | 61-123628 | 6/1986 |
| JP | 63-235320 A | 9/1988 |
| JP | 04-145123 | 5/1992 |
| JP | 06-316630 | 11/1994 |
| JP | 10-506137 | 6/1998 |

OTHER PUBLICATIONS

Aoshima et al., Poly(alkylene ether) polyols, Asahi chemical Industry Co., Ltd., Japan, Chem Abstract 107: 40546.*

* cited by examiner

Primary Examiner—Duc Truong
(74) Attorney, Agent, or Firm—Hoffmann & Baron, LLP

(57) ABSTRACT

A method for preparing a polyether polyol copolymer includes the step of copolymerizing (1) a cyclic ether represented by the following formula (I):

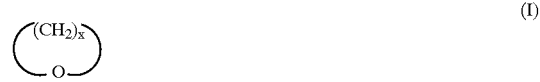

wherein x is an integer ranging from 2 to 10; (2) a diol represented by the following formula (II):

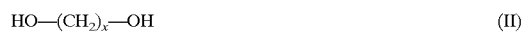

wherein x is the same as that specified above; and (3) other polyols, in the presence of an acid catalyst. The method permits the arbitrary modification of the content of the $O(CH_2)_x$ units present in the main chain of a polyether polyol copolymer so that the copolymer may have an appropriate crystallinity suitable for use as an elastomer by controlling the ratio of the diol represented by Formula (II) used in the copolymerization and simultaneously permits the change of the molecular weight of the resulting polyether polyol copolymer.

19 Claims, No Drawings

METHOD FOR PREPARING POLYETHER POLYOL COPOLYMER

The application claims priority from Japanese Patent Application No. 2001-260995 filed on Aug. 30, 2001.

BACKGROUND OF THE INVENTION

The present invention relates to a method for preparing a polyether polyol copolymer, in particular, a polyether polyol having repeating units of group: $O(CH_2)_x$ as an essential structural unit of the copolymer, which permits the control of the content of the repeating units: $O(CH_2)_x$ present on the copolymer so that it falls within a desired range.

Polyether polyol is a polyether glycol having hydroxyl groups on the both sides thereof and is in general prepared through the ring-opening polymerization of a cyclic ether. In this respect, there has been investigated a method for preparing a variety of polyether polyols comprising the step of copolymerizing cyclic ethers and diols in order to improve physical properties of such polyether polyols.

When a polyether polyol copolymer is prepared by copolymerizing a specific cyclic ether and a specific diol, a specific polyether polyol whose content of oxypolymethylene repeating units ($O(CH_2)_x$ repeating units) falls within a desired range can be prepared by carrying out the foregoing copolymerization, while properly designing the resulting copolymer such that the content of the oxypolymethylene repeating units, observed when the cyclic ether is opened, is adjusted to an intended range. In this case, however, it is impossible to adjust the molecular weight of the polyether polyol copolymer derived from the cyclic ether and diol to a desired range. On the other hand, if the molecular weight of the polyether polyol copolymer is controlled to a desired range, the content of the oxypolymethylene repeating units present in the polyether polyol copolymer cannot be adjusted so as to fall within a desired range.

Among the polyether glycols having hydroxyl groups on the both sides thereof, particularly industrially significant ones are poly(tetramethylene ether) glycols (hereunder referred to as "PTMEG") prepared through the ring-opening polymerization of tetrahydrofuran (hereunder referred to as "THF"). This PTMEG possesses oxy-tetramethylene repeating units and has widely been used as a material for elastic materials used in, for instance, spandex, synthetic leather and optical fibers. However, an elastomer derived from the PTMEG, in particular, that having a high molecular weight is quite susceptible to crystallization at a low temperature or during storage over a long period of time and it suffers from various problems such that physical properties thereof at a low temperature are insufficient and that the physical properties thereof deviate from the desired ones or the designed ones, during storage.

As a means for solving these problems, there has been proposed a method, which makes use of a copolymerized PTMEG obtained by the copolymerization of THF with other cyclic ethers instead of a PTMEG as a homopolymer of THF. In this method, the regularity in the arrangement of the resulting molecule is put into disorder, if THF and other cyclic ethers are copolymerized to thus reduce the crystallinity of the resulting copolymer molecules. For instance, there have been disclosed a copolymerized PTMEG of THF and 3-methyloxetane in Japanese Examined Patent Publication (hereunder referred to as "J. P. KOKOKU") No. Hei 4-20013; and a copolymerized PTMEG of THF and 3-alkyltetrahydrofuran in J.P. KOKOKU No. Hei 7-116276.

However, these methods, which make use of such ring-opening copolymerization, require the use of cyclic ether compounds other than THF as copolymerizable components. For this reason, these methods suffer from problems in that the kinds of cyclic ethers used in such copolymerization are considerably limited because of the difficulty of preparing cyclic ether compounds and that the production cost of the cyclic ether is liable to be high as compared with that required for the preparation of polyols.

As another method for synthesizing a copolymerized PTMEG there has been known one, which makes use of glycols as components to be copolymerized with THF instead of cyclic ethers. Various kinds of glycols have been known and glycols are cheaper than the cyclic ethers and therefore, the use of glycols may extend the tolerance in the molecular design of such a copolymerized PTMEG. More specifically, J.P. KOKOKU No. Hei 7-13139 discloses a method for preparing a polyether polyol from THF and a glycol in the presence of a hetero-polyacid, as a catalyst, which contains at most 15 water molecules coordinated thereto or present therein.

On the other hand, when using a copolymerized PTMEG as a material for elastomers, it is quite important to control the ratio of copolymerizable components other than THF. If the ratio of such a copolymerizable component is low, the PTMEG is still strongly susceptible to crystallization and accordingly, the resulting elastomer is insufficient in the improvement of the intended low temperature properties and storage stability. On the other hand, if the ratio of such a copolymerizable component is high, the low temperature properties and storage stability of the resulting elastomer can be improved, but other physical properties are greatly influenced and the tensile strength thereof may, for instance, be extremely reduced.

When preparing a copolymerized PTMEG having an intended molecular weight by copolymerizing THF and a glycol, however, the charged mass ratio of the THF to the glycol is unconditionally determined and therefore, the ratio of the oxy-tetramethylene repeating units present in the resulting copolymerized PTMEG is also constant. In other words, when copolymerizing THF and a glycol, a copolymer having a desired content of oxy-tetramethylene repeating units can be prepared by carrying out the copolymerization in such a manner that the content of oxy-tetramethylene repeating units resulted from the ring-opening of the THF is equal to that of the designed copolymer, but the molecular weight of the copolymerized PTMEG derived from THF and a glycol is not in agreement with that of designed copolymer. On the other hand, if the molecular weight of the copolymerized PTMEG is controlled to a desired level, the content of the oxy-polymethylene repeating units present in the resulting copolymer cannot be adjusted so as to fall within a desired range. This phenomenon is also observed in the case disclosed in J.P. KOKOKU No. Hei 7-13139 and any copolymerized PTMEG whose content of oxy-tetramethylene repeating units and molecular weight were simultaneously changed or controlled could not be prepared.

On the other hand, even in case where cyclic ethers other than THF are used, a material having desired physical properties can easily be prepared if the content of the oxyalkylene repeating units derived from a cyclic ether and the molecular weight can simultaneously be controlled in the resulting polyether polyol copolymer. However, there has not yet been proposed any such a technique.

SUMMARY OF THE INVENTION

Accordingly, it is an object of the present invention to provide a method for preparing a polyether polyol copolymer suitably used as an elastomer material, which can arbitrarily change the content of $O(CH_2)_x$ units present in the main chain of the copolymer and can simultaneously control the molecular weight thereof so that the resulting copolymer has an appropriate crystallizability.

The inventors of this invention have conducted various studies to achieve the foregoing object, have found that the foregoing problems associated with the conventional techniques can effectively be eliminated by the simultaneous use of a specific cyclic ether and a diol having a structure similar to that obtained by ring-opening the cyclic ether when copolymerizing the specific cyclic ether with other polyols in the presence of an acid catalyst to thus give a polyether polyol copolymer having $O(CH_2)_x$ repeating units as essential structural units and have thus completed the present invention.

According to a first aspect of the present invention, there is provided a method for preparing a polyether polyol copolymer comprising the step of copolymerizing (1) a cyclic ether represented by the following formula (I):

(I)

wherein x is an integer ranging from 2 to 10; (2) a diol represented by the following formula (II):

(II)

wherein x is the same as that specified above; and (3) other polyols, in the presence of an acid catalyst.

According to a second aspect of the present invention, there is provided a method for preparing a polyether polyol comprising the step of copolymerizing (1) tetrahydrofuran, (2) 1,4-butanediol and (3) other polyols, in the presence of an acid catalyst.

According to a third aspect of the present invention, there is provided the use of a combination of the foregoing cyclic ether represented by Formula (I) and the diol represented by Formula (II) in the method for preparing a polyether polyol, in order to adjust the content of $O(CH_2)_x$ units present in the $O(CH_2)_x$ unit-containing polyether polyol copolymer.

According to a fourth aspect of the present invention, there is provided the use of a combination of tetrahydrofuran and 1,4-butanediol in the method for preparing a polyether polyol, in order to adjust the content of $O(CH_2)_x$ units present in the $O(CH_2)_x$ unit-containing polyether polyol copolymer.

DESCRIPTION OF THE PREFERRED EMBODIMENTS

The cyclic ethers usable in the method of the present invention are those represented by the following formula (I):

(I)

wherein x is an integer ranging from 2 to 10, preferably 2 to 4 and particularly preferably 4. The methylene group included in the formula (I) may be substituted with a $C_1$ to $C_4$ alkyl group. The alkyl group may be a linear or branched one. The number of the alkyl substituent is not particularly restricted and the methylene group may be mono- or di-substituted one with such alkyl groups, but it is preferably mono-substituted one. The alkyl substituent may be present on any position on the methylene chain, but it is preferred that the methylene groups on both sides of the oxygen atom are not simultaneously substituted. Specific examples of the cyclic ethers include, but are not limited to, ethylene oxide, propylene oxide, oxetane, 3-methyloxetane, 3,3-dimethyloxetane, oxepane, butene-1-oxide, butene-2-oxide, 3,3-bischloromethyl oxetane, tetrahydrofuran, 2-methyl-tetrahydrofuran and 3-methyl-tetrahydrofuran. Among them, preferred is tetrahydrofuran.

The diols usable in the method of the present invention are those represented by the following formula (II):

(II)

wherein x is the same as that specified above.

If the cyclic ether of Formula (I) is substituted with a $C_1$ to $C_4$ alkyl group, the diol of Formula (II) is also substituted with a $C_1$ to $C_4$ alkyl group at the corresponding position. Specific examples of such diols include, but are not restricted to, ethylene glycol, 1,3-propanediol, 1,4-butanediol, 1,6-hexanediol, 1,9-nonanediol, 1,2-propanediol, 2-methyl-1,3-propanediol, neopentyl glycol and 2-methyl-1,4-butanediol. Among these diols, preferred is 1,4-butanediol.

As the polyether polyols prepared by the method of the present invention, preferred are those represented by the following formula (1):

(1)

The polyether polyol represented by Formula (1) may be a block copolymer, a random copolymer or an alternating copolymer.

In Formula (1), m and n are integers satisfying the following relation: $m+n \leq 100$. As used herein, the symbol "$\leq$" means less than to equal to. R is not restricted to any particular one insofar as it does not represent any cyclic ether of Formula (I) or a structure different from that obtained by ring-opening the cyclic ether or that of the corresponding $O(CH_2)_x$ unit derived from the diol of Formula (II). For instance, in the cyclic ether of Formula (I) and the diol of Formula (II), X=4 and if the methylene group is not substituted with an alkyl group, R may be a group other than tetramethylene group. In addition, R may be an aliphatic hydrocarbon group, an aromatic hydrocarbon group or a combination thereof, or it may be a cyclic or linear group, or it may comprise a heteroatom such as a nitrogen, oxygen, sulfur or silicon atom. Alternatively, it may be a group comprising several kinds of groups.

In Formula (1), the ratio of m to n falls within the range: $0.5 \leq m/(m+n) \leq 0.99$.

The foregoing other polyols from which the group (OR) in the foregoing formula (1) is derived may appropriately be selected on the basis of the intended physical properties of the resulting elastomer and are not restricted to particular ones. For instance, when using tetrahydrofuran as the cyclic ether of Formula (I) and 1,4-butanediol as the diol of Formula (II), the other polyols may be any one other than 1,4-butanediol and examples thereof include, but are not restricted to, ethylene glycol, 1,3-propanediol and 1,5-pentanediol.

Specific examples of such other polyols include ethylene glycol, 1,3-propanediol, 1,4-butanediol, 1,5-pentanediol, 1,6-hexanediol, 1,9-nonanediol, 1,2-propanediol, 2-methyl-1,3-propanediol, neopentyl glycol, 2-methyl-1,4-butanediol, 3-methyl-1,5-pentanediol, spiro-glycols such as (3,9-bis(1,1-dimethyl-2-hydroxyethyl)-2,4,8,10-tetraoxa-spiro [5,5]

undecane and 3,9-diethanol-2,4,8,10-tetraoxa-spiro [5,5] undecane, 1,4-cyclohexane-dimethanol, 1,4-dihydroxymethyl-benzene, bisphenol A, bisphenol F, polyoxyalkylene glycol, thio-diethylene glycol, alcohol-modified polydimethyl-siloxane and alkylene oxide adducts of polydimethyl-siloxane.

Among these polyols, preferred are ethylene glycol, 1,3-propanediol, 1,4-butanediol, 1,5-pentanediol, 1,6-hexanediol, 1,9-nonanediol, 1,2-propanediol, 2-methyl-1,3-propanediol, neopentyl glycol, 2-methyl-1,4-butanediol, 3-methyl-1,5-pentanediol, spiro-glycols, 1,4-cyclohexane-dimethanol and 1,4-dihydroxymethyl-benzene. In this connection, the alcohol-modified polydimethyl-siloxane may, for instance, be polydimethyl-siloxanes having hydroxyl groups on the both sides thereof and usable herein include those commercially available from Toshiba Silicone Co., Ltd. under the trade name of alcohol-modified Silicone PSF-4751. The amount of these polyols to be used may appropriately selected depending on the intended physical properties of the elastomer, but the amount thereof is preferably selected such that the content of the $O(CH_2)_x$ units in the resulting polyether polyol falls within the range of from about 50% to about 99%, more preferably about 75% to about 97% and most preferably about 80% to about 95%, as expressed in terms of the molar ratio.

The acid catalyst usable in the method of the present invention is not restricted to any particular one inasmuch as it permits the direct occurrence of the reaction of a cyclic ether represented by Formula (I) with a diol of Formula (II). Examples thereof include 1) hetero-polyacids, which contain a specific amount of water coordinated thereto or present therein, or salts thereof or these catalysts supported on carriers; and 2) catalysts comprising molded carriers composed of moieties constituted from zirconia and/or water-containing zirconia having tetragonal systems and moieties constituted from alumina and/or water-containing alumina and a sulfuric acid component supported on the carriers. The amount of the acid catalyst to be used is not restricted to any particular range, but preferably ranges from about 0.1 to about 70 parts by mass and more preferably about 10 to about 60 parts by mass per 100 parts by mass of the cyclic ether of Formula (I).

The hetero-polyacid, which contains a specific amount of water coordinated thereto or present therein, or a salt thereof or such a catalyst supported on a carrier, which can be used in the method of the present invention is a catalyst, which contains at most 15 water molecules coordinated thereto or present therein per one molecule of the hetero-polyacid, with a catalyst, which contains at most 8 water molecules coordinated thereto or present therein, being preferred since it can immediately show its activity. Moreover, it is preferred to make not less than 0.1 water molecules per one molecule of the hetero-polyacid coordinate or exist in the reaction system. Such catalysts are disclosed in, for instance, JP Kokai Hei 10-506137.

The coordination number of water in the catalyst can be controlled by, for instance, heating a commonly available hetero-polyacid whose coordination number of water ranges from about 20 to about 40 to a temperature of, for instance, 250° C. for 3 hours.

In the method of the present invention, water is formed by the reaction in which the polyol and the diol of Formula (II) used in the present invention are incorporated into the resulting polymer chain through ether bonds and therefore, the polymerization activity of the catalyst disappears if the water content of the reaction system exceeds 15 times the molar amount of the hetero-polyacid. For this reason, it is desirable that the molar ratio of the diol of Formula (II) and other polyols used and the amount of the coordinated water and/or that of water present in the hetero-polyacid prior to the reaction are controlled in such a manner that the total amount of the water coordinated to or present in the hetero-polyacid prior to the reaction and the water generated during the polymerization never exceeds 15 times the molar amount of the hetero-polyacid. Moreover, it is also desirable that water is removed out of the reaction system by a means such as distillation so that the amount of water in the system does not exceed 15 times the molar amount of the hetero-polyacid.

The term "polyacid(s)" used in the present invention is a generic name of oxy-acids formed by condensing at least one oxide of Mo, W and V with an oxy-acid of, for instance, P, Si, As, Ge, B, Ti, Ce or Co. In this respect, the atomic ratio of the former to the latter preferably ranges from 2.5 to 12.

Specific examples of such hetero-polyacids are phosphomolybdic acid, phosphotungstic acid, phospho-molybdotungstic acid, phospho-molybdovanadic acid, phospho-molybdoniobic acid, silicotungstic acid, silicomolybdic acid, silicomolybdo-tungstic acid, silicomolybdo-tungstovanadic acid, germanium tungstate, boro-tungstic acid, boromolybdic acid, boromolybdo-tungstic acid, boromolybdo-vanadic acid, boro-molybdotungstovanadic acid, cobalt molybdic acid, cobalt tungstic acid, arseno-molybdic acid, arseno-tungstic acid, titano-molybdic acid and cerium molybdic acid.

The catalysts comprising molded carriers composed of moieties constituted from zirconia and/or water-containing zirconia having tetragonal systems and moieties constituted from alumina and/or water-containing alumina and a sulfuric acid component supported on the carriers, which may be used in the method of the present invention, may be those disclosed in International Patent Publication No. WO 98/9727. These catalysts can be prepared by kneading an aluminum hydroxide and/or a hydrated oxide thereof, a zirconium hydroxide and/or a hydrated oxide thereof and a sulfuric acid component-containing compound, forming the kneaded mixture into a desired shape and then firing the resulting molded article at a temperature, which permits the formation of zirconia having a tetragonal structure. Alternatively, it is also possible to adopt a method, which comprises the steps of kneading an aluminum hydroxide and/or a hydrated oxide thereof, a zirconium hydroxide and/or a hydrated oxide thereof and a sulfuric acid component-containing compound, forming the kneaded mixture into a desired shape, firing the resulting molded article at a temperature, which permits the formation of zirconia having a tetragonal structure, allowing a metal component belonging to the Group 8, 9 or 10 to support on the resulting tetragonal zirconia and then calcining the metal-supporting zirconia at a temperature ranging from about 300° C. to about 700° C.

The foregoing catalysts preferably have a surface area of not less than 150 m$^2$/g. The catalysts preferably used in the present invention are those prepared using aluminum hydrated oxides having a boehmite structure as the catalyst component or the aluminum hydroxide and/or the hydrated oxide thereof.

In general, a specific method for preparing such a catalyst preferably uses the aluminum hydroxide and/or the hydrated oxide thereof in the form of powder, preferably having an average particle size ranging from about 0.5 μm to about 50 μm, in particular, about 0.5 μm to about 20 μm, in order to improve the crushing strength and the specific surface area of the resulting catalyst. The zirconium hydroxide and/or the hydrated oxide thereof may be prepared by any method, but they can in general be prepared by neutralizing or hydrolyzing salts or organometal compounds of these components such as oxychlorides, alcoholates, chlorides, sulfates, nitrates and oxy-sulfates. These substances are preferably used in the form of powder, preferably having an average particle size ranging from about 0.5 µm to about 50 µm, in particular, about 0.5 µm to about 20 µm, in order to improve the crushing strength and the specific surface area of the resulting catalyst. The zirconium hydroxide and/or the hydrated oxide thereof and/or the salt thereof may further comprise other metal hydroxides and/or hydrated oxides thereof and/or salts thereof. Examples of other metals preferably used herein are titanium, hafnium, vanadium, chromium, manganese, iron, silicon, tin, aluminum and gallium. The compounds of these metals may be complex metal compounds. However, the zirconium hydroxide or hydrated oxides thereof preferably used herein are those substantially comprising only zirconium as the metal component.

The sulfuric acid component-containing compound used for the preparation of the catalyst may be, for instance, sulfuric acid, ammonium sulfate, sulfurous acid, ammonium sulfite and thionyl chloride, with ammonium sulfate and ammonium sulfite being preferably used herein because of their low probability of attacking the production devices. The sulfuric acid component-containing compound may be used as such or in the form of a solution such as an aqueous solution. The amount of the sulfuric acid component-containing compound to be used upon the preparation of a catalyst preferably ranges from about 3% to about 30% by mass, in particular, about 5% to about 20% by mass on the basis of the total mass of the aluminum hydroxide and/or the hydrated oxide thereof, the zirconium hydroxide and/or the hydrated oxide thereof in an amorphous state and the sulfuric acid component-containing compound, prior to the firing step, since the catalyst activity can thus be improved.

The foregoing ingredients for the catalyst may be kneaded using any kneading machine currently used in the preparation of catalysts. In general, a kneading method preferably used comprises adding water to the raw material and then admixing the resulting mixture with a stirring blade and in this connection, the order of adding the raw material and additives is not restricted to any specific one. In general, water is added to the raw material upon kneading, but other liquid may likewise be used and examples thereof are organic solvents such as ethanol, 2-propanol, acetone, methyl ethyl ketone and methyl isobutyl ketone. In the kneading step, the kneading temperature and time are not particularly restricted to specific ranges, respectively. In addition, the method for molding the kneaded mixture of the raw materials subsequent to the kneading step is not likewise restricted to any particular one and may be one currently used in the preparation of catalysts. The extrusion molding method such as that, which makes use of, for instance, a screw extruder, is preferably adopted since the method permits the effective molding of the kneaded mixture into, in particular, any shape such as pellet-like and honeycomb-like shapes. The size of the molded body is not restricted to any particular range, but those having a length (or diameter) of the cross section ranging from about 0.5 mm to about 10 mm and a length (overall length) ranging from about 0.5 mm to about 15 mm can easily be produced. The crushing strength achieved after the firing of the molded body is largely affected by the kneading method and therefore, it is desirable that various factors during the foregoing kneading such as the water content of the kneaded mixture, the kneading time and the quantity of electric power to be supplied be determined in advance. The firing step is conducted at a temperature, which permits the formation of zirconia having a tetragonal structure in a gas atmosphere such as an air or nitrogen gas atmosphere. When using quasi-boehmite type alumina, the preferred firing temperature ranges from about 450° C. to about 800° C., in particular, about 500° C. to about 800° C. and more preferably about 600° C. to about 800° C., while the preferred firing time ranges from about 0.5 hours to about 10 hours.

As the metal component used in the preparation of the catalyst and selected from the Groups 8, 9 and 10, favorably used herein include, in particular, platinum, palladium, ruthenium, nickel or the like and it is more preferred that the metal component is preferably those in the form of a compound rather than the elemental metal. These metal compounds usable herein may be anhydrides or hydrates. Moreover, these metal compounds can be used alone or in any combination of at least two of them.

The method for supporting the catalyst on a carrier used in the method of the present invention is not limited to any particular one, but preferably used herein are, for instance, immersion methods such as spraying and dipping methods and ion-exchange methods. This catalyst preferably has a strong acidity HO (Hammett acidity function) of stronger than −11.93 and a specific surface area of not less than about 150 m$^2$/g. The specific surface area of the catalyst is preferably not less than about 200 m$^2$/g and, in particular, about 200 m$^2$/g to about 300 m$^2$/g in order to achieve high catalyst activity and crushing strength.

Regarding the monomers used in the method of the present invention, the cyclic ether of Formula (I), the diol of Formula (II) and other polyols are essential monomer components, but cyclic ethers other than those represented by the formula (I) may simultaneously be used in an amount, which never adversely affects the excellent characteristic properties of the $O(CH_2)_x$ units. Examples of such cyclic ethers other than the specific cyclic ethers represented by the formula (I) include ethylene oxide, oxetane, oxepane, propylene oxide, butene-1-oxide, butene-2-oxide, cyclohexene oxide, styrene oxide, epichlorohydrin, 3,3-bischloromethyl oxetane, 2-methyltetrahydrofuran and 3-methyltetrahydrofuran. These other cyclic ethers may be used in combination. The amount thereof to be used is preferably not more than 25 parts by mass and more preferably not more than 15 parts by mass per 100 parts by mass of the cyclic ether of Formula (I).

The copolymerization reaction is preferably carried out at ordinary pressure or under pressure, more preferably at ordinary pressure at a temperature ranging from about −20° C. to about 100° C. and more preferably about 40° C. to about 70° C. In addition, the reaction time is not limited to any particular range, but suitably ranges from about 2 to about 12 hours.

Moreover, the resulting polyether polyol copolymer preferably has a number average molecular weight ranging from 500 to 5000 and more preferably 650 to 4000.

The present invention will hereunder be described in more detail with reference to the following Examples, but the present invention is not restricted to these specific Examples at all.

In the following Examples, the molecular weight is determined by the gel permeation chromatography (GPC) and the melting point is determined according to the differential scanning calorimeter (DSC).

PREPARATION EXAMPLE 1

Preparation of Catalyst A

Commercially available phosphotungstic acid ($H_3PW_{12}O_{40} \cdot 26H_2O$) was calcined at 250° C. for 2 hours to give phosphotungstic acid anhydride (Catalyst A).

EXAMPLES 1 TO 3

To a container of glass, there were added 50 g of Catalyst A, 100 g of THF as well as 1,3-propanediol and 1,4-butanediol in the amounts specified in the following Table 1, followed by conducting the reaction of these components in a nitrogen gas atmosphere, at ordinary pressure and 60° C. for 6 hours with stirring. After the completion of the reaction, the catalyst was removed from the reaction solution and the un-reacted THF was distilled off to thus directly obtain a copolymerized PTMEG having hydroxyl groups on the both sides thereof. This copolymerized PTMEG was analyzed by the GPC and as a result, it was found that the resulting PTMEG copolymer did not contain both of the un-reacted 1,3-propanediol and 1,4-butanediol used as starting monomers. The foregoing liquid containing the un-reacted THF was analyzed by the gas chromatography and as a result, it was confirmed that the liquid did not contain both of the un-reacted 1,3-propanediol and 1,4-butanediol monomers at all.

The results thus obtained are summarized in the following Table 1.

COMPARATIVE EXAMPLES 1 TO 2

To a container of glass, there were added 50 g of Catalyst A, 100 g of THF as well as 1,3-propanediol and 1,4-butanediol in the amounts specified in the following Table 1, followed by the reaction of these components in a nitrogen gas atmosphere, at ordinary pressure and 60° C. for 6 hours with stirring. After the completion of the reaction, the catalyst was removed from the reaction solution and the un-reacted THF was distilled off to thus directly obtain a copolymerized PTMEG having hydroxyl groups on the both sides thereof. This copolymerized PTMEG was analyzed to evaluate the same and the results obtained are summarized in the following Table 1.

In Table 1, the abbreviations "PDO" and "BDO" stand for 1,3-propanediol and 1,4-butanediol, respectively. In addition, in Tables 1 to 3, the term "Amt. Obtained" means the amount of the resulting copolymerized PTMEG (as expressed in terms of the number of gram) per 100 g of THF charged. Moreover, "Mn" and "MP" stands for number average molecular weight and melting point, respectively.

TABLE 1

| Ex. No. | PDO (g) | BDO (g) | Amt. Obtained | Mn | MP (° C.) | Content |
|---|---|---|---|---|---|---|
| 1 | 4.6 | 1.8 | 30 | 2040 | 14 | 15 |
| 2 | 3.0 | 3.6 | 31 | 2020 | 17 | 9 |
| 3 | 1.5 | 5.4 | 30 | 2010 | 23 | 5 |
| 1* | 0 | 7.2 | 33 | 2050 | 27 | 0 |
| 2* | 6.1 | 0 | 32 | 2040 | 9 | 18 |

*Comparative Example
Note: "Content" means the amount (mole %) of the PDO monomer units present in the polyether polyol copolymer.

As will be seen from the data listed in the column entitled "MP" (melting point), the method of the present invention would permit the modification of the content of 1,3-propanediol in the copolymer while maintaining the molecular weight of the resulting copolymerized PTMEG.

EXAMPLES 4 TO 9

The same reaction procedures used in Example 1 were repeated except that the following polyols was substituted for the 1,3-propanediol used in Example 1 in molar amounts identical to that of the 1,3-propanediol. The results thus obtained are listed in the following Table 2.

In the following Table 2, the abbreviation "2MePD" stands for 2-methyl-1,3-propanediol; "HOD" 1,6-hexanediol; "3MePD" 3-methyl-1,5-pentanediol; "CHDM" cyclohexane dimethanol; "DHMB" 1,4-dihydroxymethylbenzene; and "SPG" spiro-glycol (3,9-bis(1,1-dimethyl-2-hydroxyethyl)-2,4,8,10-tetraoxa-spiro [5,5] undecane).

TABLE 2

| Ex. No. | Polyol | Amt. Obtained | Mn | MP (° C.) | Content |
|---|---|---|---|---|---|
| 4 | 2MePD | 32 | 2000 | 12 | 14 |
| 5 | HDO | 34 | 1980 | 14 | 14 |
| 6 | 3MePD | 32 | 2050 | 11 | 15 |
| 7 | CHDM | 34 | 2030 | 10 | 15 |
| 8 | DHMB | 33 | 1950 | 14 | 15 |
| 9 | SPG | 41 | 2110 | 11 | 16 |

Note: "Content" means the amount (mole %) of the monomer units such as 2MePD monomer units present in the polyether polyol copolymer.

EXAMPLES 10 TO 11

The same reaction procedures used in Example 1 were repeated except that 1,3-propanediol (PDO) and 1,4-butanediol (BDO) were used in the amounts specified in the following Table 3. The results obtained are summarized in the following Table 3.

COMPARATIVE EXAMPLE 3

The same reaction procedures used in Example 1 were repeated except that 1,4-butanediol (BDO) was used in the amount specified in the following Table 3. The results obtained are summarized in the following Table 3.

TABLE 3

| Ex. No. | PDO (g) | BDO (g) | Amt. Obtained | Mn | MP (° C.) | Content |
|---|---|---|---|---|---|---|
| 10 | 3.2 | 6.1 | 22 | 900 | 13 | 14 |
| 11 | 3.6 | 5.6 | 21 | 880 | 8 | 19 |
| 3* | 0 | 9.9 | 23 | 910 | 23 | 0 |

*Comparative Example
Note: "Content" means the amount (mole %) of the PDO monomer units present in the polyether polyol copolymer.

As has been described above in detail, the method of the present invention permits the arbitrary modification of the content of the $O(CH_2)_x$ units present in the main chain of a polyether polyol copolymer so that the copolymer may have an appropriate crystallinity suitable for use as an elastomer by controlling the using ratio of the diol represented by the formula (II) used in the copolymerization and simultaneously permits the change of the molecular weight of the resulting polyether polyol copolymer. More specifically, the method of the present invention permits the modification of the content of the monomer units derived from other polyols (3) present in the resulting polyether polyol copolymer, while maintaining the molecular weight of the polyether polyol copolymer almost constant and on the other hand, the method likewise permits the change of the molecular weight of the resulting polyether polyol copolymer, while maintaining the content of the monomer units derived from other polyols (3) present in the copolymer almost constant.

What is claimed is:

1. A method for preparing a polyether polyol copolymer comprising the step of copolymerizing (1) a cyclic ether represented by the following formula (I):

(I)

wherein x is an integer ranging from 2 to 10;
(2) a diol represented by the following formula (II):

$HO-(CH_2)_x-OH$ (II)

wherein x is an integer ranging from 2 to 10, provided that the both x appearing in the formulas (I) and (II) are the same integers at the same time; and
(3) other polyols, in the presence of an acid catalyst.

2. The method of claim 1, wherein in the formulas (I) and (II), x is an integer ranging from 2 to 4.

3. The method of claim 2, wherein in the formulas (I) and (II), x is 4.

4. The method of claim 1, wherein the acid catalyst is used in an amount ranging from about 0.1 to about 70 parts by mass per 100 parts by mass of the cyclic ether represented by the formula (I).

5. The method of claim 1, wherein the copolymerization is carried out at a temperature ranging from about −20° C. to about 100° C.

6. The method of claim 1, wherein a polyoxyalkylene glycol copolymer having a number average molecular weight ranging from about 500 to about 5,000 is prepared.

7. The method of claim 1, wherein the content of $O(CH_2)_x$ units present in the resulting polyether polyol copolymer ranges from about 50 mole % to about 99 mole %.

8. The method of claim 7, wherein the content of $O(CH_2)_x$ units ranges from about 75 mole % to about 97 mole %.

9. The method of claim 1, wherein the acid catalyst is a hetero-polyacid.

10. The method of claim 1, wherein the other polyol is at least one member selected from the group consisting of ethylene glycol, 1,3-propanediol, 1,4-butanediol, 1,5-pentanediol, 1,6-hexanediol, 1,9-nonanediol, 1,2-propanediol, 2-methyl-1,3-propanediol, neopentyl glycol, 2-methyl-1,4-butanediol, 3-methyl-1,5-pentanediol, spiro-glycols, 1,4-cyclohexane-dimethanol, 1,4-dihydroxymethyl-benzene, bisphenol A, bisphenol F, polyoxyalkylene glycol, thio-diethylene glycol, alcohol-modified polydimethyl-siloxane and alkylene oxide adducts of polydimethyl-siloxane.

11. The method of claim 1, which comprises the step of copolymerizing
(1) the cyclic ether wherein x in the formula (I) is an integer ranging from 2 to 4;
(2) the diol and
(3) other polyols, in the presence of a hetero-polyacid catalyst at a temperature ranging from about −20° C. to about 100° C. to prepare a polyoxyalkylene glycol copolymer having a number average molecular weight ranging from about 500 to about 5,000
wherein the content of $O(CH_2)_x$ units present in the resulting polyoxyalkylene glycol copolymer ranges from about 50 mole % to about 99 mole %.

12. A method for preparing a polyether polyol copolymer comprising the step of copolymerizing (1) tetrahydrofuran, (2) 1,4-butanediol and (3) other polyols, in the presence of an acid catalyst.

13. A method of adjusting a content of $O(CH_2)_x$ units present in a polyether polyol copolymer, which comprises the step of using a combination of the cyclic ether represented by the formula (I) as set forth in claim 1 and the diol represented by the formula (II) as set forth in claim 1 in a method for preparing an $O(CH_2)_x$ unit-containing polyether polyol copolymer.

14. The method of claim 13 wherein in the formulas (I) and (II), x is an integer ranging from 2 to 4.

15. The method of claim 13 wherein in the formulas (I) and (II), x is 4.

16. The method of claim 13, wherein the number average molecular weight of the polyether polyol copolymer ranges from about 500 to about 5,000.

17. The method of claim 13, wherein the content of $O(CH_2)_x$ units present in the resulting polyether polyol copolymer ranges from about 50 mole % to about 99 mole %.

18. The method of claim 13, wherein the preparation method uses an acid catalyst.

19. A method of adjusting a content of $O(CH_2)_x$ units present in $O(CH_2)_x$ unit-containing polyether polyol copolymer, which comprises the step of using a combination of tetrahydrofuran and 1,4-butanediol in a method for preparing a polyether polyol copolymer.

* * * * *